US012578749B2

(12) United States Patent
Hosono et al.

(10) Patent No.: US 12,578,749 B2
(45) Date of Patent: Mar. 17, 2026

(54) MULTIDIRECTIONAL INPUT DEVICE

(71) Applicant: ALPS ALPINE CO., LTD., Tokyo (JP)

(72) Inventors: Kunio Hosono, Fukushima (JP); Tetsuo Muranaka, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/813,564

(22) Filed: Aug. 23, 2024

(65) Prior Publication Data

US 2024/0411337 A1 Dec. 12, 2024

Related U.S. Application Data

(63) Continuation of application No. PCT/JP2023/005033, filed on Feb. 14, 2023.

(30) Foreign Application Priority Data

Mar. 10, 2022 (JP) ................................. 2022-037451

(51) Int. Cl.
*G05G 9/047* (2006.01)
*G06F 3/0338* (2013.01)

(52) U.S. Cl.
CPC ........... *G05G 9/047* (2013.01); *G06F 3/0338* (2013.01); *G05G 2009/04744* (2013.01); *G05G 2009/04762* (2013.01)

(58) Field of Classification Search
CPC ......... G05G 9/047; G05G 2009/04744; G05G 2009/04762; G06F 3/0338
See application file for complete search history.

(56) References Cited

U.S. PATENT DOCUMENTS

| | | | | |
|---|---|---|---|---|
| 5,541,622 A | * | 7/1996 | Engle | H01H 13/807 |
| | | | | 345/161 |
| 5,594,618 A | * | 1/1997 | Sellers | G06F 1/1616 |
| | | | | 361/679.13 |

(Continued)

FOREIGN PATENT DOCUMENTS

| | | |
|---|---|---|
| JP | 2003-084915 | 3/2003 |
| JP | 2003-092045 | 3/2003 |

(Continued)

OTHER PUBLICATIONS

International Search Report for PCT/JP2023/005033 mailed on May 9, 2023.

*Primary Examiner* — Joseph Brown
*Assistant Examiner* — Gregory T Prather
(74) *Attorney, Agent, or Firm* — IPUSA, PLLC

(57) ABSTRACT

A multidirectional input device is capable of performing a tilting operation and a pressing operation. The device includes a strain inducing body that includes a cylindrical portion and one or more deformable portions provided on an outer side of the cylindrical portion, a plunger provided inside of the cylindrical portion of the strain inducing body, a strain detecting element provided at the deformable portion of the strain inducing body, a substrate provided on a bottom portion of the cylindrical portion of the strain inducing body, and an elastic member provided between the substrate and a bottom portion of the plunger. The strain inducing body is fixed to a device main body at an outer end portion of the deformable portion. The substrate is fixed to the strain inducing body.

10 Claims, 10 Drawing Sheets

(56)     References Cited

U.S. PATENT DOCUMENTS

| 2008/0055281 | A1 | 3/2008 | Hirano et al. |
| 2013/0051889 | A1 | 2/2013 | Kimura et al. |

FOREIGN PATENT DOCUMENTS

| JP | 2008-059210 | 3/2008 |
| JP | 2013-047871 | 3/2013 |

* cited by examiner

MULTIDIRECTIONAL INPUT DEVICE

CROSS-REFERENCE TO RELATED APPLICATIONS

This application is a continuation application of International Application No. PCT/JP2023/005033 filed on Feb. 14, 2023, and designated the U.S., which is based upon and claims priority to Japanese Patent Application No. 2022-037451 filed on Mar. 10, 2022, the entire contents of which are incorporated herein by reference.

BACKGROUND

1. Field of the Invention

The present invention relates to a multidirectional input device.

2. Description of the Related Art

A multidirectional input device that detects an operation direction and an operation amount of an operation element with a plurality of strain detectors provided on an elastic plate that can be deformed by being pressed with the operation element is known.

SUMMARY

A multidirectional input device according to one embodiment is capable of performing a tilting operation and a pressing operation. The multidirectional input device includes: a strain inducing body that includes a cylindrical portion and one or more deformable portions provided on an outer side of the cylindrical portion; a plunger provided inside of the cylindrical portion of the strain inducing body; a strain detecting element provided at the deformable portion of the strain inducing body; a substrate provided on a bottom portion of the cylindrical portion of the strain inducing body; and an elastic member provided between the substrate and a bottom portion of the plunger. The strain inducing body is fixed to a device main body at an outer end portion of the deformable portion, and the substrate is fixed to the strain inducing body.

DETAILED DESCRIPTION

Figure 1:
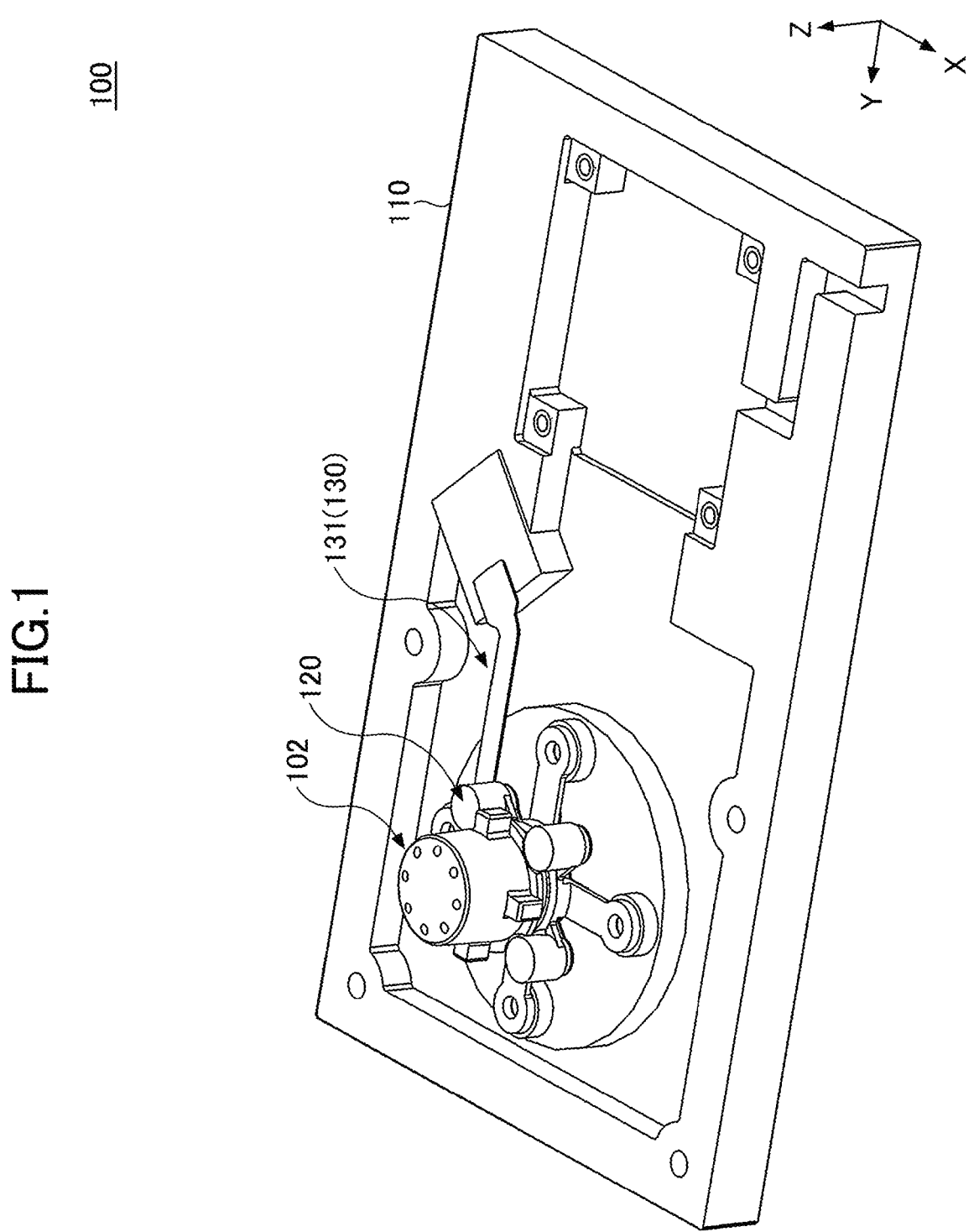
FIG. 1 is a perspective exterior view of an example of a multidirectional input device according to a first embodiment.

With the technique disclosed in Japanese Unexamined Patent Application No. 2003-92045, the elastic plate is not deformed until the operation element presses the elastic plate after a pressing operation of the operator is started. For this reason, the detection with the plurality of strain detectors cannot be performed, that is, the pressing operation cannot be detected.

According to a multidirectional input device of an embodiment, a very small load of a pressing operation can be detected with high accuracy.

Hereinafter, an embodiment will be described with reference to the accompanying drawings. In the description hereinafter, for convenience, a "vertical direction" corresponds to the Z-axis direction in the drawings, and a "horizontal direction" corresponds to the X-axis direction and the Y-axis direction in the drawings.

First Embodiment (Configuration of Multidirectional Input Device 100)

Figure 2:
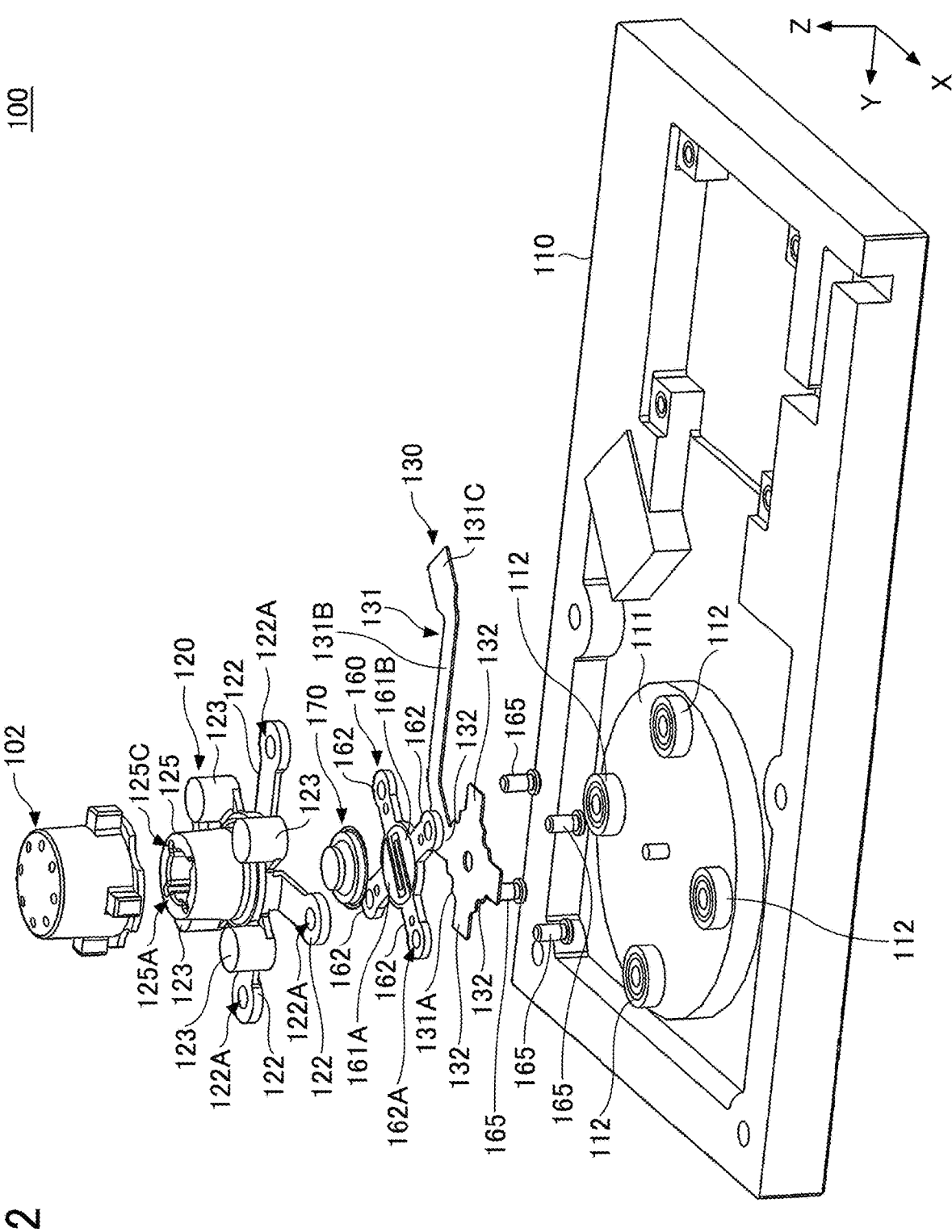
FIG. 2 is an exploded perspective view illustrating an upper surface side of the multidirectional input device according to the first embodiment.
Figure 3:
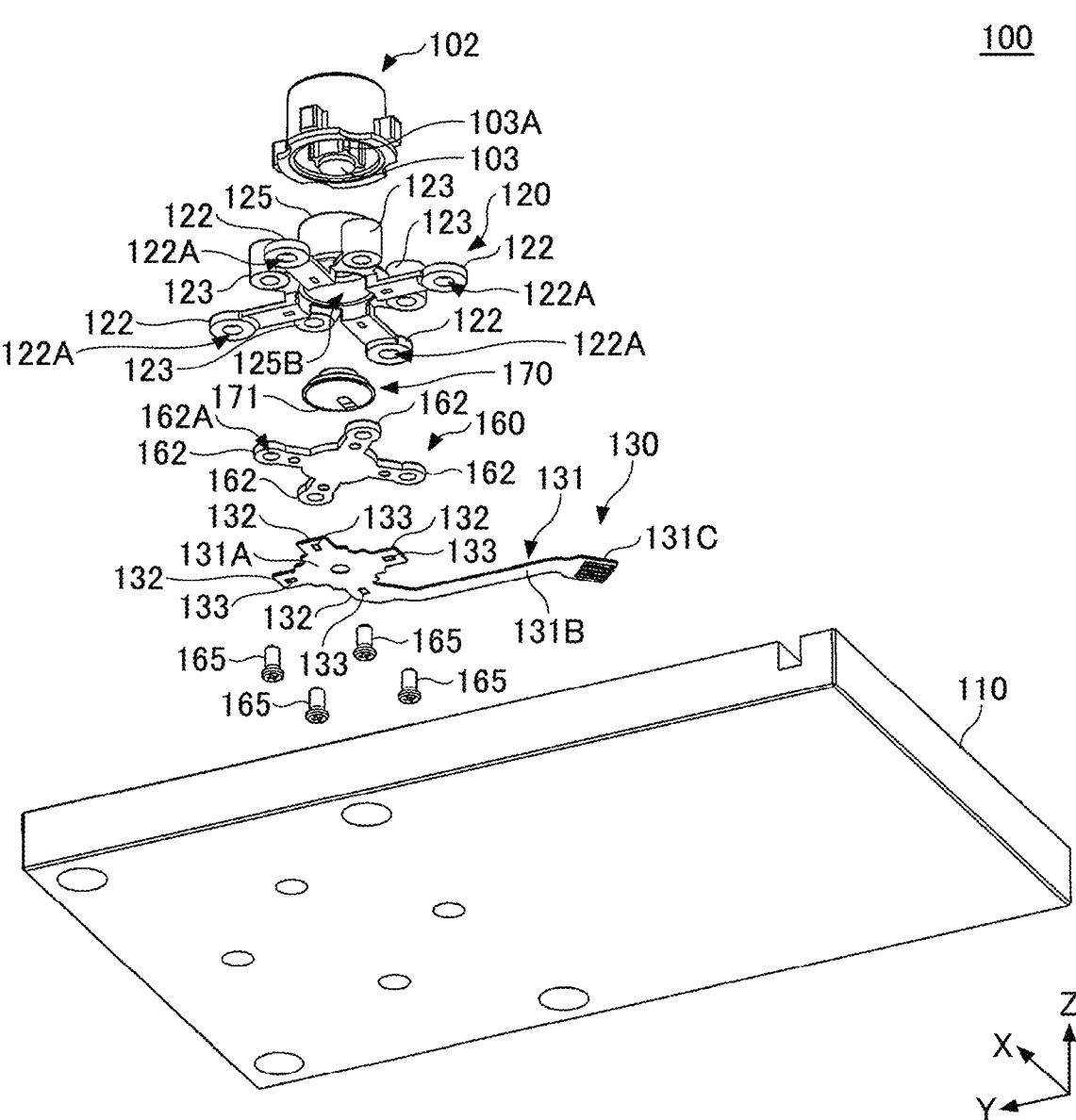
FIG. 3 is an exploded perspective view illustrating a lower surface side of the multidirectional input device according to the first embodiment.
Figure 4:
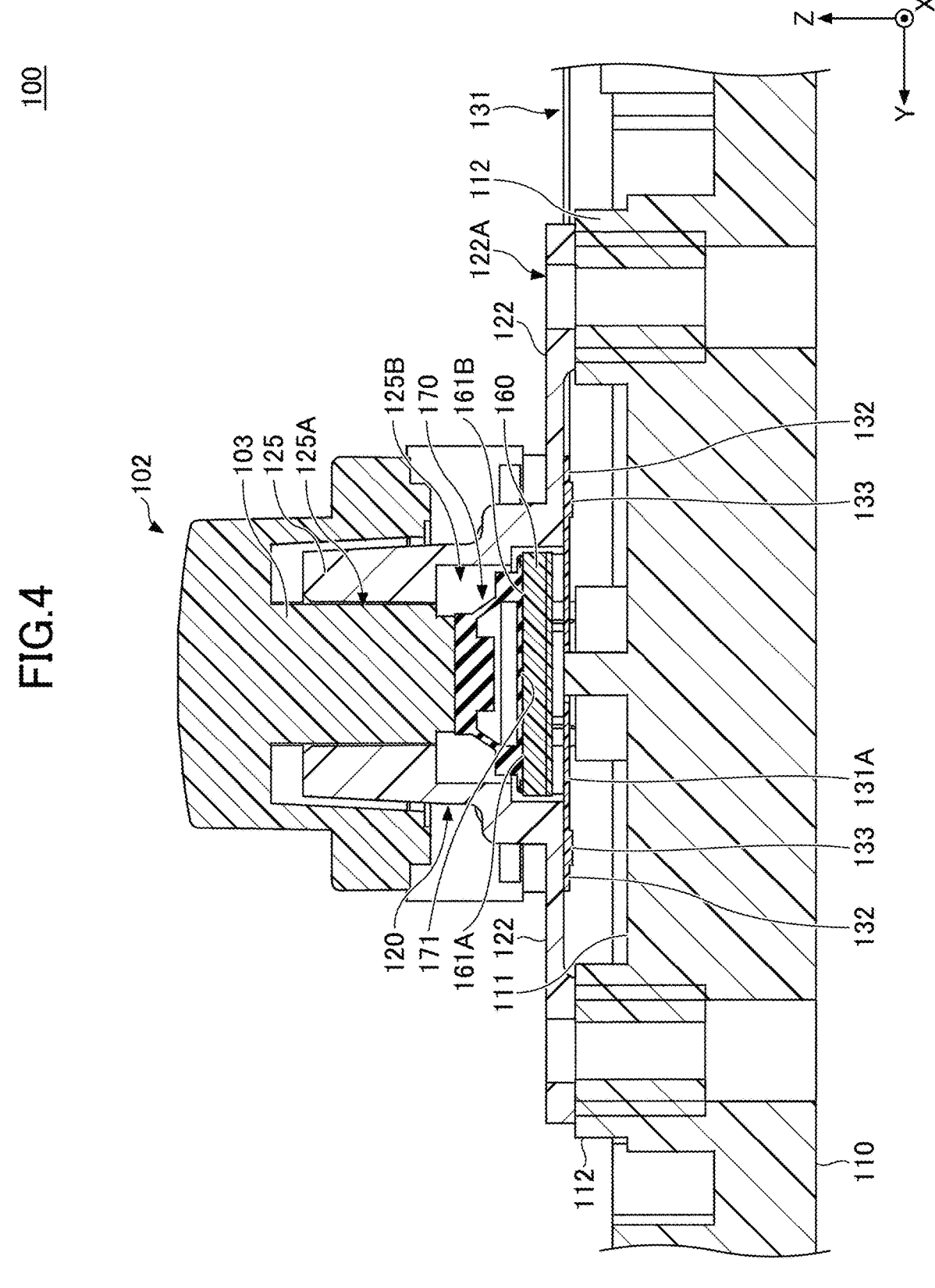
FIG. 4 is a cross-sectional view of the multidirectional input device according to the first embodiment.
Figure 5:
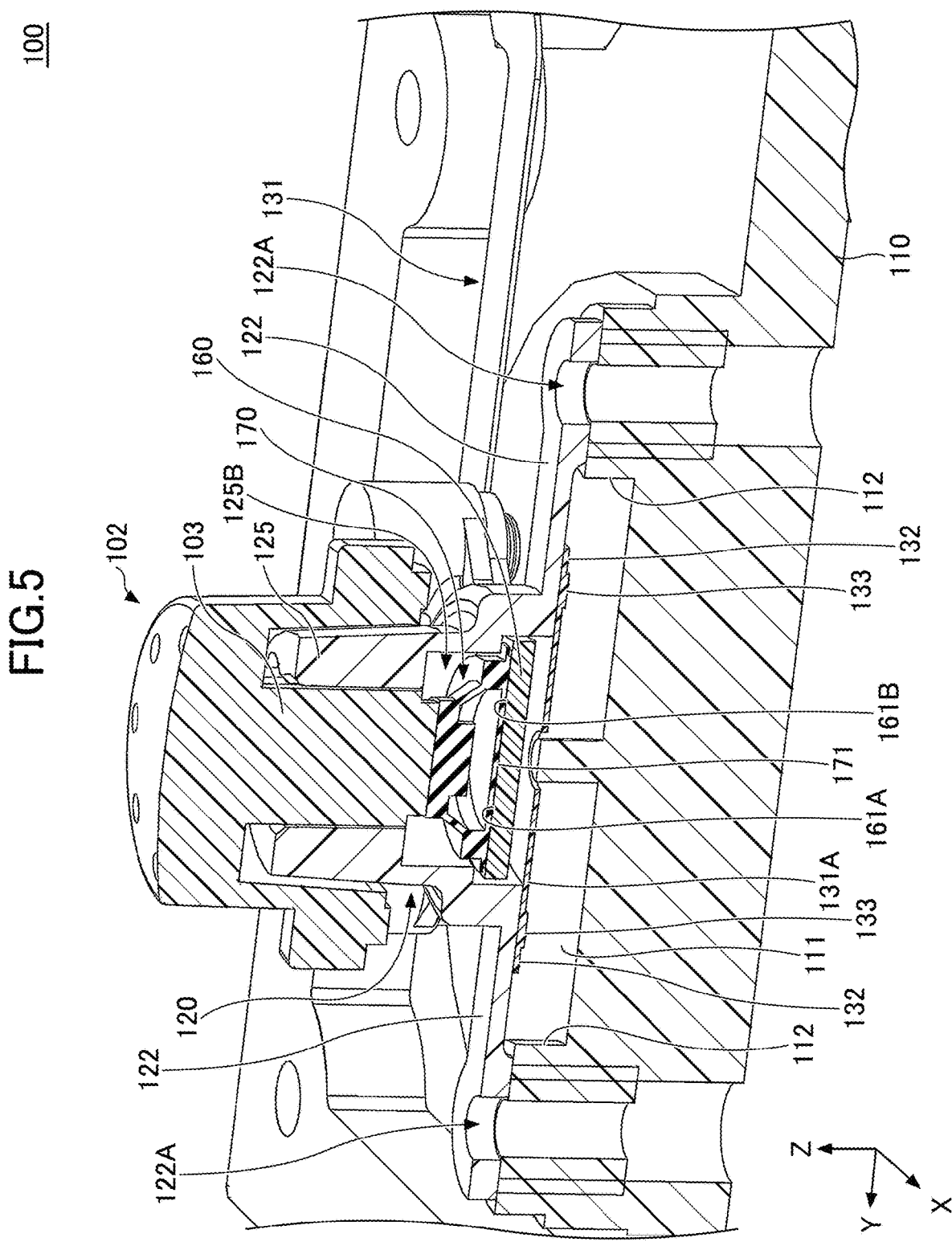
FIG. 5 is a cross-sectional perspective view of the multidirectional input device according to the first embodiment.

FIG. 1 is a perspective exterior view of a multidirectional input device 100 according to the first embodiment. FIG. 2 is an exploded perspective view of an upper surface side of the multidirectional input device 100 according to the first embodiment. FIG. 3 is an exploded perspective view of a lower surface side of the multidirectional input device 100 according to the first embodiment. FIG. 4 is a cross-sectional view of the multidirectional input device 100 according to the first embodiment. FIG. 5 is a cross-sectional perspective view of the multidirectional input device 100 according to the first embodiment.

The multidirectional input device 100 illustrated in FIGS. 1 through 5 is an input device that is used for game machines, industrial vehicles, robot operations, and the like, and capable of performing a tilting operation in multiple directions (in an X-axis direction, a Y-axis direction, and a direction combining these directions) and a pressing operation in a downward direction (in a negative Z-axis direction). As illustrated in FIGS. 1 through 5, the multidirectional input device 100 includes a cap 102, a strain inducing body 120, a load detector 130, a substrate 160, an elastic member 170, and a device main body 110.

<Cap 102>

The cap 102 is a resin-made member attached to a cylindrical portion 125 of the strain inducing body 120 and is subjected to a tilting operation and a pressing operation performed by a user. The cap 102 has a cylindrical shape with a closed upper portion and an open lower portion.

A rod-shaped plunger 103 extending in a vertical direction (Z-axis direction) is provided integrally with the cap 102 at the center of the cylinder of the cap 102. The cap 102 is attached to the cylindrical portion 125 of the strain inducing body 120 and covers the upper portion and the outside of the cylindrical portion 125. The plunger 103 is inserted into an upper space 125A of the cylindrical portion 125 of the strain inducing body 120. The outer peripheral surface of the plunger 103 is provided with four projections 103A respectively projecting in four directions.

<Strain Inducing Body 120>

The strain inducing body 120 is a resin-made member that causes strain in response to reception of an operation load from the cap 102. The strain inducing body 120 includes the cylindrical portion 125 and four deformable portions 122. The cylindrical portion 125 is provided at the center of the strain inducing body 120 and is a cylindrical portion having the vertical direction (Z-axis direction) as the cylindrical direction. The inside of the cylindrical portion 125 has an upper space 125A and a lower space 125B. The upper space 125A is a portion on the upper side (the Z-axis positive side) inside the cylindrical portion 125. The plunger 103 is inserted into the upper space 125A. The inner diameter of the upper space 125A is substantially the same as the outer diameter of the plunger 103. The lower space 125B is a lower portion (the negative Z-axis side) of the inside of the cylindrical portion 125. The lower space 125B has a larger inner diameter than the upper space 125A. The substrate 160 and the elastic member 170 are arranged in the lower space 125B. The four deformable portions 122 are provided in such a manner that they respectively protrude in four directions at intervals of 90° from the lower end portion of the cylindrical portion 125. Each of the four deformable portions 122 has a shape of a plate having a width in the planar direction larger than a thickness in the vertical direction.

Four grooves 125C respectively provided in four directions and extending in the vertical direction (Z-axis direction) are provided on the inner peripheral surface of the cylindrical portion 125. The four protrusions 103A of the plunger 103 are vertically slidable inside the four grooves 125C, respectively.

Each of the four deformable portions 122 has a through hole 122A formed at its outer end portion. The strain inducing body 120 is screwed and fixed to the device main body 110 at an outer end portion by four screws (not illustrated) penetrating through the respective through holes 122A of the four deformable portions 122 from the upper side (the Z-axis positive side).

The device main body 110 includes a device-side protrusion 112 projecting upward from a flat portion 111 at a position facing the outer end portion of the deformable portion 122. The outer end portion of each of the four deformable portions 122 is screwed and fixed to the device-side protrusion 112 of the device main body 110.

As illustrated in FIGS. 4 and 5, the outer end portion of each of the four deformable portions 122 is thicker than the other portion of the deformable portion 122, and thus protrudes downward relative to the other portion of the deformable portion 122.

<Load Detector 130>

The load detector 130 detects strain of the strain inducing body 120 caused by a tilting operation and a pressing operation performed on the cap 102. The load detector 130 includes an FPC 131 and four strain detecting elements 133.

The FPC 131 is an example of a "flexible printed circuit board" and is a film-like interconnect member having flexibility. The FPC 131 includes a base portion 131A, a lead-out portion 131B, and a connecting portion 131C. The base portion 131A is a circular portion in a plan view, which is bonded to a central portion of the bottom surface of the strain inducing body 120 (bonded coaxially with the central axis of the cap 102). The lead-out portion 131B is a portion extending in a horizontal direction from the base portion 131A to the outside of the multidirectional input device 100. The connecting portion 131C is provided at the distal end of the lead-out portion 131B and is electrically connected to an external component (e.g., a connector). The FPC 131 has four protrusions 132 protruding in four directions at intervals of 90° from the base portion 131A, respectively.

The four strain detecting elements 133 are arranged on the four protrusions 132 of the FPC 131, respectively. In other words, the four strain detecting elements 133 are arranged in the FPC 131 in four directions with respect to the center axis of the cap 102, respectively. The four protrusions 132 are respectively bonded to the bottom surfaces of the four deformable portions 122 of the strain inducing body 120. Thus, the four strain detecting elements 133 are respectively arranged on the bottom surfaces of the four deformable portions 122 of the strain inducing body 120, together with the FPC 131. Each of the strain detecting elements 133 is a resistor printed on the FPC 131. For this reason, the strain detecting elements 133 change in resistance value by deforming together with the FPC 131.

The load detector 130 can detect, by means of the four strain detecting elements 133, strain of the four deformable portions 122 of the strain inducing body 120 caused by an application of an operation load to the cylindrical portion 125 of the strain inducing body 120, and output, to an external device, a strain detection signal (analog signal) indicating the detected strain as a detection signal indicating the direction in which the load is applied and the magnitude of the load.

<Substrate 160>

The substrate 160 is a resin-made plate-shaped member provided in the lower space 125B on the lower side inside the cylindrical portion 125 of the strain inducing body 120. The substrate 160 is formed in a cross shape having four arm portions 162 arranged at intervals of 90 degrees. The substrate 160 is screwed and fixed to the strain inducing body 120 by four screws 165 respectively penetrating through the through holes 162A formed at the distal ends of the four arms 162 from the lower side (the Z-axis negative side). Specifically, the strain inducing body 120 includes four fixing pieces 123 provided at intervals of 90 degrees and respectively protruding in four directions (they are, however, shifted from the four deformable portions 122 by 45 degrees) from the lower end of the cylindrical portion 125. The four arm portions 162 of the substrate 160 are screwed to the four fixing pieces 123, respectively.

The deformable portions 122 of the strain inducing body 120 are provided at positions protruding downward beyond the fixing pieces 123 of the strain inducing body 120.

<Elastic Member 170>

The elastic member 170 is provided between the substrate 160 and the bottom portion of the plunger 103 in the lower space 125B on the lower side of the inside of the cylindrical portion 125 of the strain inducing body 120. The elastic member 170 is formed using an elastic material such as rubber or silicon, and is elastically deformable in the vertical direction (the Z-axis direction). In a case where a pressing operation is not performed on the cap 102, the elastic member 170 has a dome shape that is convex in an upward direction (in the positive Z-axis direction).

A movable contact 171 is provided on the bottom surface of the central portion of the elastic member 170. Two fixed contacts 161A and 161B are provided on the upper surface of the central portion of the substrate 160. In a case where the elastic member 170 is elastically deformed, the movable contact 171 comes into contact with the two fixed contacts 161A and 161B, and the two fixed contacts 161A and 161B can thus be electrically connected to each other.

(Operation of Multidirectional Input Device 100)

In the multidirectional input device 100 configured as described above, in response to a tilting operation performed on the cap 102, a load is applied to the cylindrical portion 125 of the strain inducing body 120 in the tilting operation direction via the plunger 103. A load is thus applied to each of the four deformable portions 122 of the strain inducing body 120 that support the cylindrical portion 125. Since the outer end portion of each of the four deformable portions 122 is fixed to the device main body 110, distortion corresponding to the tilting operation occurs in each of the four deformable portions 122. The multidirectional input device 100 can detect strain of each of the four deformable portions 122 by the four strain detecting elements 133 provided in the load detector 130, and can output, to an external device, a strain detection signal (analog signal) representing the strain of each of the four deformable portions 122 via the FPC 131 as a detection signal representing the direction of the tilting operation and the magnitude of the load.

In response to a pressing operation performed on the cap 102, on the other hand, in the multidirectional input device 100, a load is applied in a downward direction (in the negative Z-axis direction) to the substrate 160 via the plunger 103 and the elastic member 170. As a result, a load is applied to the strain inducing body 120 to which the substrate 160 is fixed, and a load is applied to each of the four deformable portions 122 supporting the strain inducing body 120. Since the outer end portion of each of the four deformable portions 122 is fixed to the device main body 110, strain occurs in the four deformable portions 122 according to the pressing operation. Specifically, substantially the same amount of strain in the same direction occurs in each of the four deformable portions 122. The multidirectional input device 100 can detect the strain of each of the four deformable portions 122 with the four strain detecting elements 133 provided in the load detector 130, and output, to an external device, a strain detection signal (analog signal) representing the strain of each of the four deformable portions 122 via the FPC 131 as a detection signal representing the magnitude of the load of the pressing operation.

Upon an operation amount of the cap 102 attaining a predetermined amount, the elastic member 170 that has been pressed down by the plunger 103 is elastically deformed, and the multidirectional input device 100 can provide a click feeling to the pressing operation. In addition, the movable contact 171 provided on the lower surface of the elastic member 170 is brought into contact with the two fixed contacts 161A and 161B provided on the upper surface of the substrate 160, and the multidirectional input device 100 can thereby bring the two fixed contacts 161A and 161B into conduction with each other. Thus, the multidirectional input device 100 can detect, separately from detection of a pressing operation with the four strain detecting elements 133, a pressing operation by bringing the two fixed contacts 161A and 161B into conduction with each other.

Furthermore, in a case where the cap 102 is further pressed in a downward direction (in the negative Z-axis direction) after the operation amount of the pressing operation of the cap 102 attains a predetermined amount, the multidirectional input device 100 can detect the load caused by this additional pressing with the four strain detecting elements 133.

Advantageous Effects

As described above, the multidirectional input device 100 according to the first embodiment is a multidirectional input device 100 capable of performing a tilting operation and a pressing operation, and includes a strain inducing body 120 having a cylindrical portion 125 and a deformable portion 122 provided outside the cylindrical portion 125, a plunger 103 provided inside the cylindrical portion 125 of the strain inducing body 120, strain detecting elements 133 provided at the deformable portion 122 of the strain inducing body 120, a substrate 160 provided at the bottom of the cylindrical portion 125 of the strain inducing body 120, and an elastic member 170 provided between the substrate 160 and the bottom of the plunger 103, wherein the strain inducing body 120 is fixed to a device main body 110 at the outer end portion of the deformable portion 122, and the substrate 160 is fixed to the strain inducing body 120.

Thus, even in a case where an operation amount of the pressing operation of the cap 102 is very small, the multidirectional input device 100 according to the first embodiment can press the substrate 160 in a downward direction with the plunger 103 via the elastic member 170. Therefore, the multidirectional input device 100 according to the first embodiment can cause strain in the strain inducing body 120 even in a case where an operation amount of the pressing operation of the cap 102 is very small (for example, to the extent that the strain inducing body 120 touches the cap 102); the strain detecting elements 133 can thus detect the very small load of the pressing operation with high accuracy.

In the multidirectional input device 100 according to the first embodiment, the elastic member 170 has a dome shape in a case where a pressing operation is not performed on the cap 102.

Thus, upon exceeding the predetermined amount for the pressing operation of the cap 102, the multidirectional input device 100 according to the first embodiment can provide a click feeling to the pressing operation.

In the multidirectional input device 100 according to the first embodiment, the substrate 160 has two fixed contacts 161A and 161B on the upper surface of the substrate 160, and the elastic member 170 has the movable contact 171 on the lower surface of the elastic member 170, which comes into contact with the two fixed contacts 161A and 161B of the substrate 160 as a result of the elastic deformation of the elastic member 170.

Thus, the multidirectional input device 100 according to the first embodiment can provide a click feeling to the pressing operation upon the pressing operation of the cap 102 exceeding a predetermined amount, and bring the two fixed contacts 161A and 161B into conduction with each other.

The multidirectional input device 100 according to the first embodiment includes the cap 102 that is integrally provided with the plunger 103 and covers the upper portion and the outer side of the cylindrical portion 125 of the strain inducing body 120.

Thus, in response to a tilting operation performed to the cap 102, the multidirectional input device 100 according to the first embodiment can cause strain in the strain inducing body 120 by pressing the side surface of the cylindrical portion 125 of the strain inducing body 120 by means of the cap 102, and can therefore detect the tilting operation with high accuracy with the strain detecting elements 133.

In the multidirectional input device 100 according to the first embodiment, the inside of the cylindrical portion 125 of the strain inducing body 120 has an upper space 125A through which the plunger 103 is inserted and a lower space 125B which is formed below the upper space 125A. The lower space 125B has a larger inner diameter than the upper space 125A and the elastic member 170 is disposed therein.

Thus, with the elastic member 170 being disposed in the lower space 125B, the multidirectional input device 100 according to the first embodiment can prevent the deformed elastic member 170 from interfering with the strain inducing body 120 and inhibiting a click feeling as a result of the interference. According to the multidirectional input device 100 of the first embodiment, the gap between the strain inducing body 120 and the plunger 103 can be reduced in the upper space 125A, and this allows the inclination of the cap 102 and the tilt of the cylindrical portion 125 to be aligned.

In the multidirectional input device 100 according to the first embodiment, the outer peripheral surface of the plunger 103 is provided with the protrusions 103A respectively protruding in four directions, and the cylindrical portion 125 of the strain inducing body 120 is provided with the grooves 125C provided in four directions respectively and extending in the vertical direction in which the protrusions 103A can slide.

Thus, in response to a tilting operation on the cap 102, the multidirectional input device 100 according to the first embodiment can detect, with the strain detecting elements 133, the load in the lateral direction applied from the plunger 103 to the strain inducing body 120 with high accuracy.

In the multidirectional input device 100 according to the first embodiment, the deformable portion 122 of the strain inducing body 120 has a plate shape in which the width in the planar direction is larger than the thickness in the vertical direction from the lower end of the cylindrical portion 125 toward the four directions.

Thus, since interference between the deformable portion 122 and other components can be suppressed through the reduction of the thickness of the deformable portion 122 and the deformable portion 122 can be made easily deformable, the multidirectional input device 100 according to the first embodiment can, with the strain detecting elements 133, detect the load applied to the strain inducing body 120 with high accuracy.

In the multidirectional input device 100 according to the first embodiment, the device main body 110 includes the device-side protrusion 112 provided to protrude upward from the flat portion 111 at a position facing the outer end portion of the deformable portion 122, and the outer end portion of the deformable portion 122 is fixed to the device-side protrusion 112.

Thus, since interference between the deformable portion 122 and other components can be suppressed and the deformable portion 122 can be made easily deformable, the multidirectional input device 100 according to the first embodiment can, with the strain detecting elements 133, detect the load applied to the strain inducing body 120 with high accuracy.

In the multidirectional input device 100 according to the first embodiment, the outer end portion of the deformable portion 122 protrudes downward relative to the other portion of the deformable portion 122.

Thus, since interference between the deformable portion 122 and other components can be suppressed and the deformable portion 122 can be made easily deformable, the multidirectional input device 100 according to the first embodiment can, with the strain detecting elements 133, detect the load applied to the strain inducing body 120 with high accuracy.

In the multidirectional input device 100 according to the first embodiment, the strain inducing body 120 includes the fixing pieces 123 protruding in four directions from the lower end of the cylindrical portion 125, and the substrate 160 is fixed to the fixing pieces 123.

Thus, since the load of the pressing operation can be effectively transmitted from the substrate 160 to the deformable portion 122 of the strain inducing body 120 via the fixing piece 123, the multidirectional input device 100 according to the first embodiment can detect, with the strain detecting elements 133, the load of the pressing operation applied to the strain inducing body 120 with high accuracy.

In the multidirectional input device 100 according to the first embodiment, the deformable portion 122 of the strain inducing body 120 is provided at a position protruding downward beyond the fixing piece 123 of the strain inducing body 120.

Thus, the multidirectional input device 100 according to the first embodiment can make the height position of the deformable portion 122 of the strain inducing body 120 lower than the fixing piece 123 of the strain inducing body 120.

In the multidirectional input device 100 according to the first embodiment, the two fixed contacts 161A and 161B provided on the upper surface of the substrate 160 may be electrically connected to the FPC 131 bonded to the lower surface of the deformable portion 122 of the strain inducing body 120, and may be thereby electrically connected to an external device via the FPC 131. In this case, each of the two fixed contacts 161A and 161B may be electrically connected to the FPC 131 provided on the bottom surface side of the substrate 160 via a through-hole via (not illustrated) provided in the substrate 160.

Thus, the multidirectional input device 100 according to the first embodiment can electrically connect the two fixed contacts 161A and 161B to an external device without providing a separate wire member.

Second Embodiment

Figure 6:
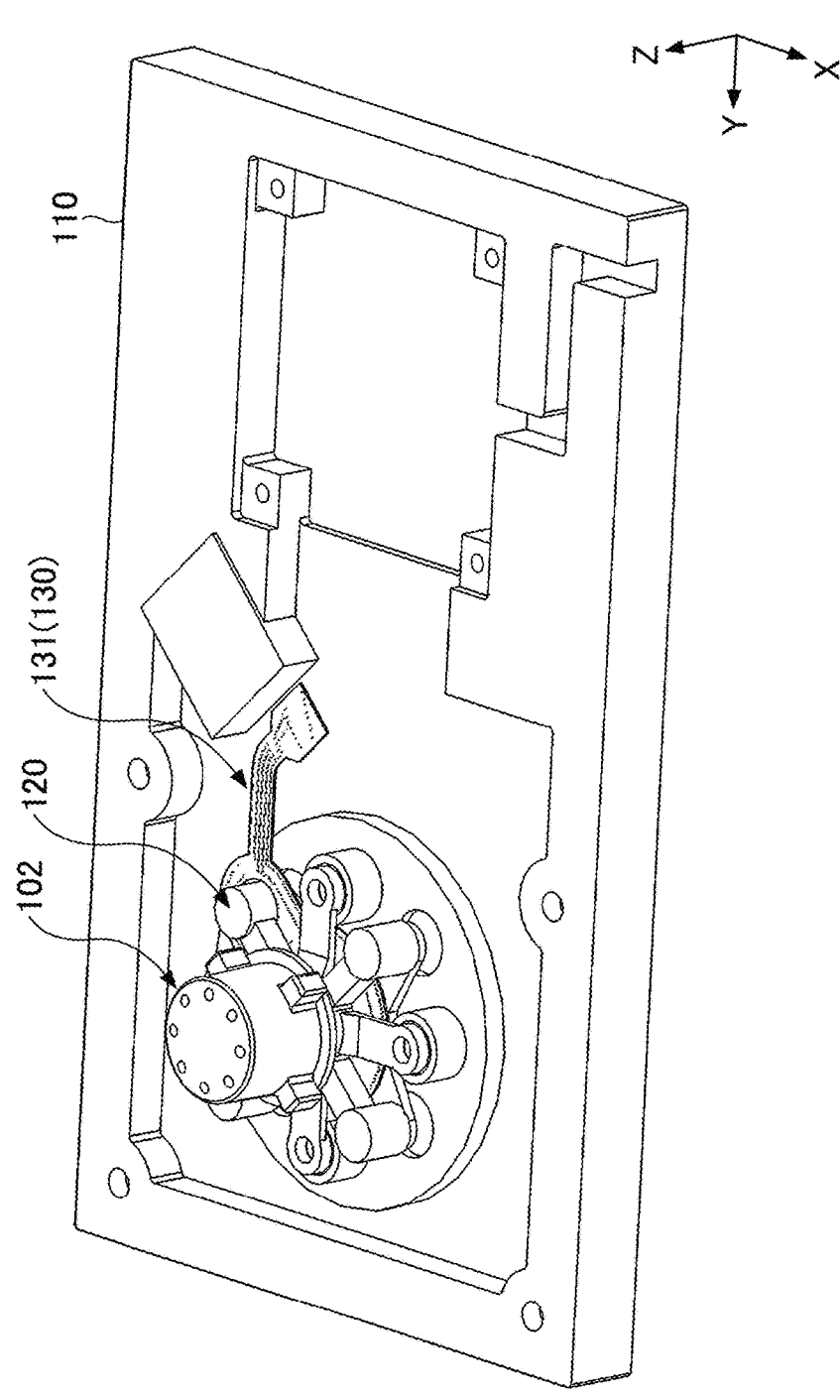
FIG. 6 is a perspective exterior view of an example of a multidirectional input device according to a second embodiment.
Figure 7:
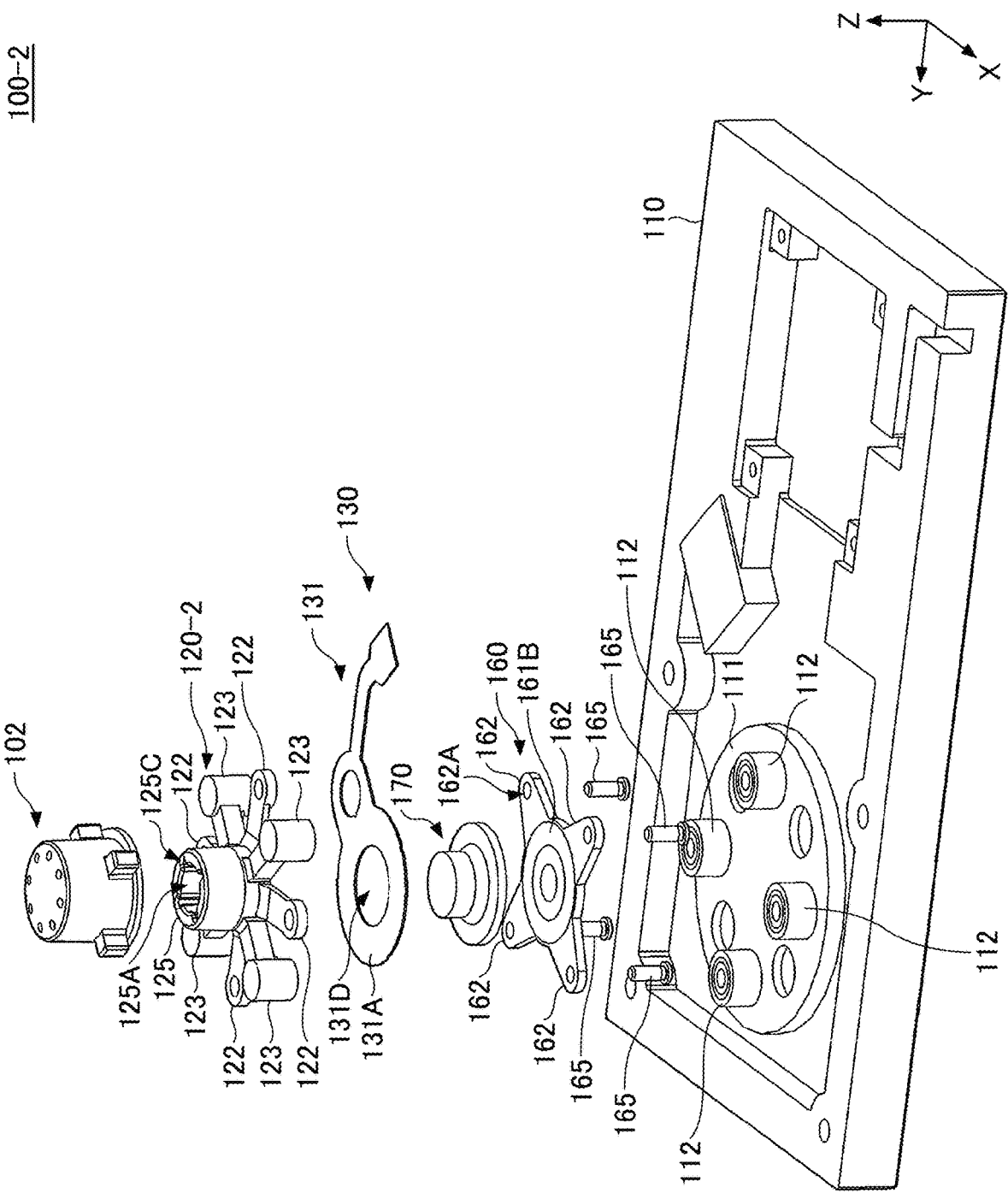
FIG. 7 is an exploded perspective view of an upper surface side of the multidirectional input device according to the second embodiment.
Figure 8:
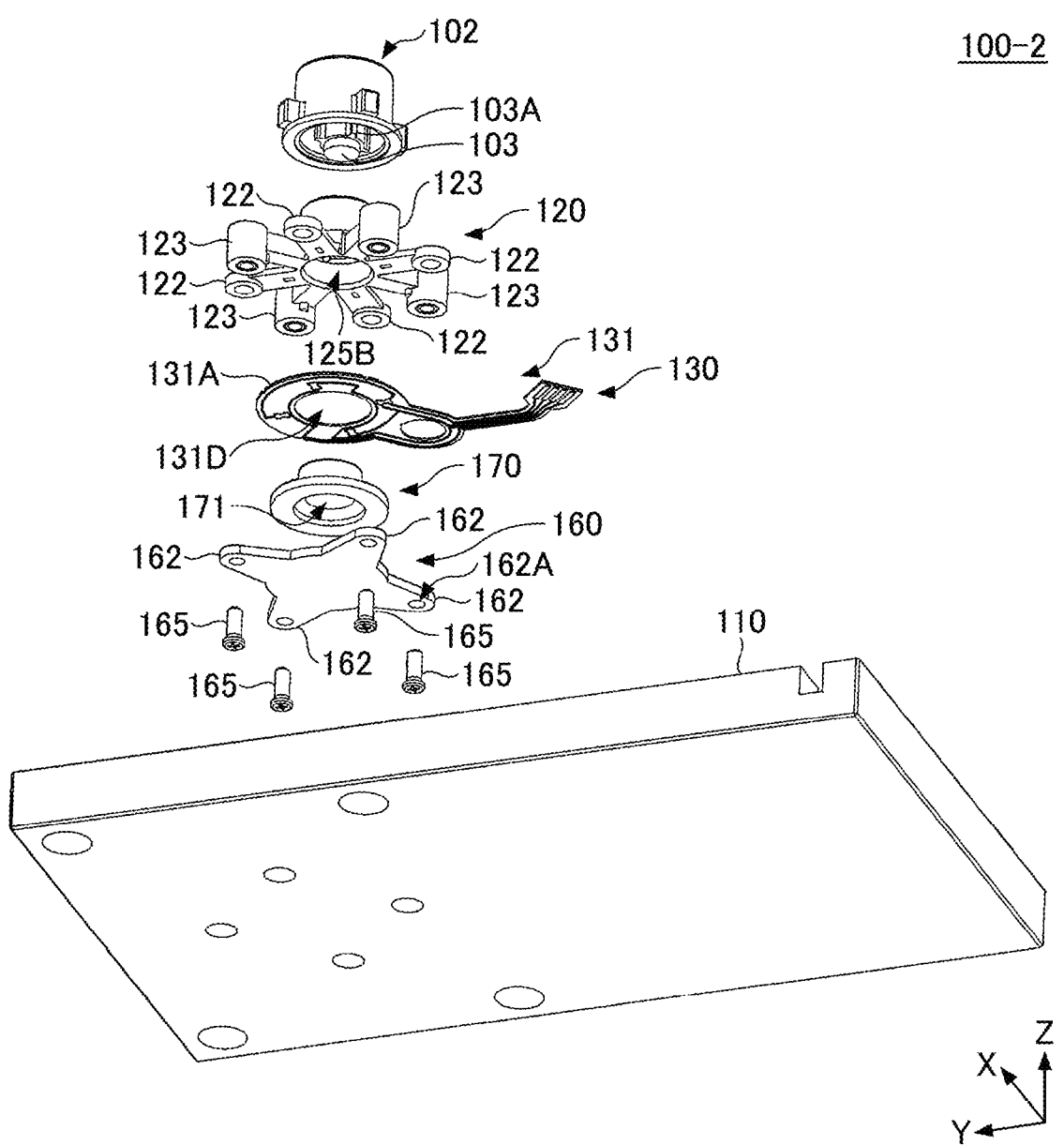
FIG. 8 is an exploded perspective view of a lower surface side of the multidirectional input device according to the second embodiment.
Figure 9:
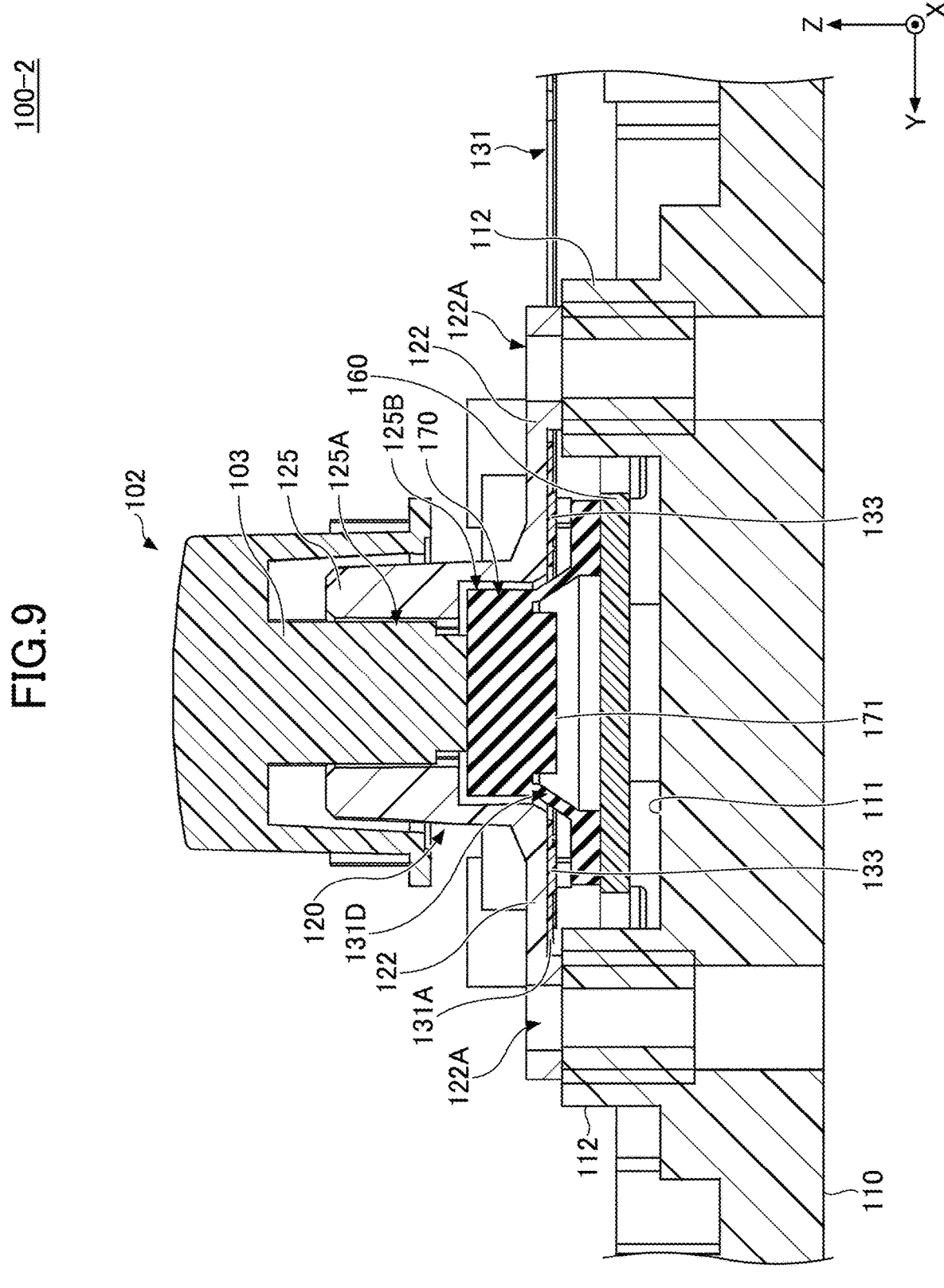
FIG. 9 is a cross-sectional view of the multidirectional input device according to the second embodiment.
Figure 10:
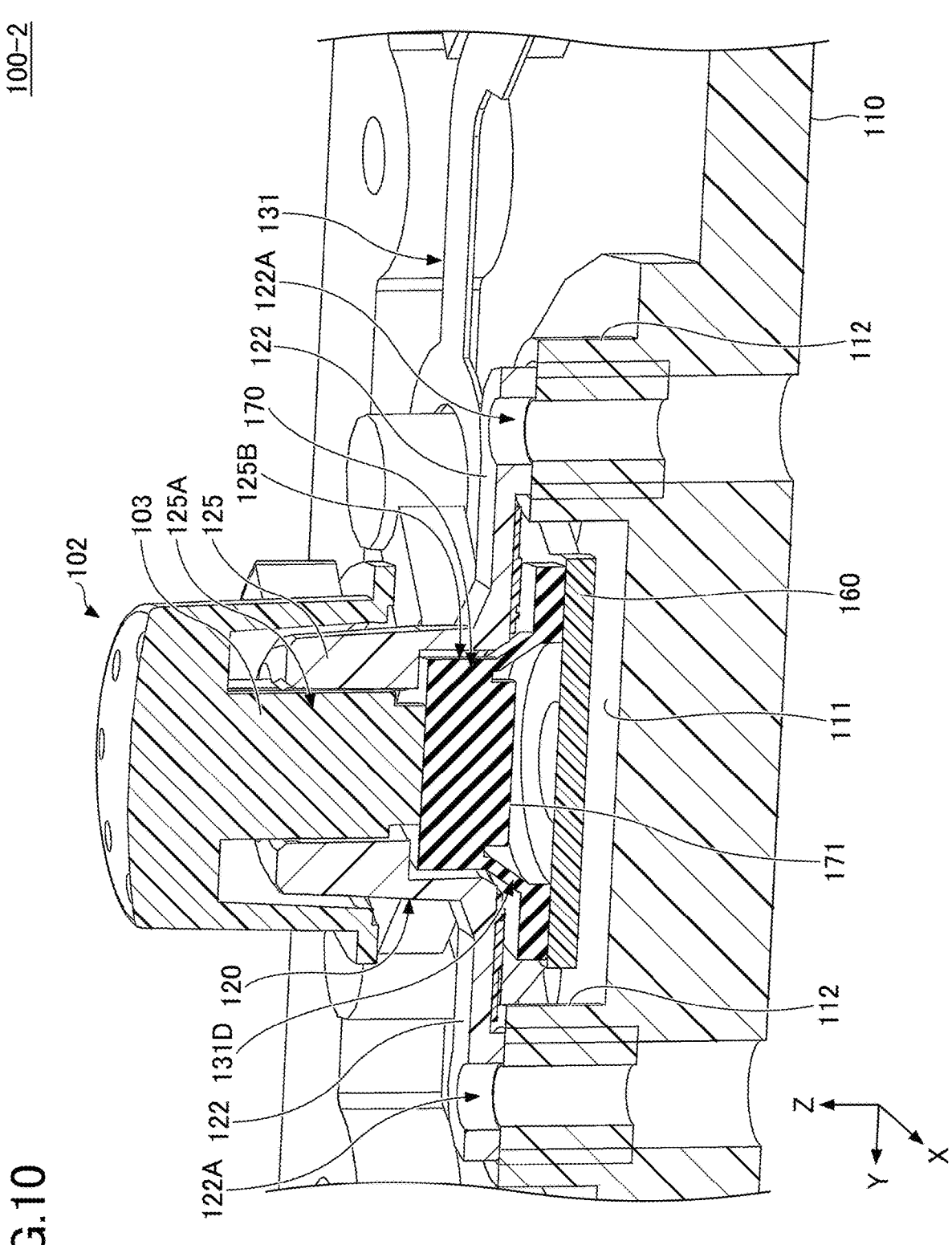
FIG. 10 is a cross-sectional perspective view of the multidirectional input device according to the second embodiment.

FIG. 6 is a perspective exterior view of a multidirectional input device 100-2 according to the second embodiment. FIG. 7 is an exploded perspective view of the upper surface side of the multidirectional input device 100-2 according to the second embodiment. FIG. 8 is an exploded perspective view of the lower surface side of the multidirectional input device 100-2 according to the second embodiment. FIG. 9 is a cross-sectional view of the multidirectional input device 100-2 according to the second embodiment. FIG. 10 is a cross-sectional perspective view of the multidirectional input device 100-2 according to the second embodiment.

Hereinafter, differences between the first embodiment and the multidirectional input device 100-2 according to the second embodiment will be mainly described.

As illustrated in FIGS. 6 through 8, the multidirectional input device 100-2 according to the second embodiment differs from the multidirectional input device 100 according to the first embodiment in that the fixing pieces 123 of the strain inducing body 120 are provided further outside.

As illustrated in FIGS. 9 and 10, the multidirectional input device 100-2 according to the second embodiment is the same as the first embodiment in that the FPC 131 is bonded to the lower surface of the deformable portion 122 of the strain inducing body 120, but differs from the first embodiment in that the substrate 160 and the elastic member 170 are provided below the lower surface of the deformable portion 122 of the strain inducing body 120.

However, in the multidirectional input device 100-2 according to the second embodiment, a circular opening portion 131D is formed in the center of the base portion 131A of the FPC 131, and a portion (a central convex portion) of the elastic member 170 penetrates the opening portion 131D and protrudes in an upward direction from the opening portion 131D.

In the multidirectional input device 100-2 according to the second embodiment, the base portion 131A of the FPC 131 has a circular shape, and the FPC 131 does not have the protrusion 132. For this reason, in the multidirectional input device 100-2 according to the second embodiment, four strain detecting elements 133 are mounted on the base portion 131A of the FPC 131.

Although the embodiments of the present invention have been described in detail, the present invention is not limited to these embodiments, and various modifications or changes can be made within the scope of the gist of the present invention described in the claims.

For example, in the multidirectional input device 100, the elastic member 170 may not include the movable contact 171, and the substrate 160 may not include the substrates 161A and 161B. In the multidirectional input device 100, the elastic member 170 may not provide a click feeling.

What is claimed is:

1. A multidirectional input device capable of performing a tilting operation and a pressing operation, the multidirectional input device comprising:

a strain inducing body that includes a cylindrical portion and one or more deformable portions provided on an outer side of the cylindrical portion;

a plunger provided inside of the cylindrical portion of the strain inducing body;

a strain detecting element provided at a deformable portion of the strain inducing body, the deformable portion being from among the one or more deformable portions;

a substrate provided on a bottom portion of the cylindrical portion of the strain inducing body;

an elastic member provided between the substrate and a bottom portion of the plunger; and a cap integrally provided with the plunger and covering an upper portion and an outer side of the cylindrical portion, wherein the strain inducing body is fixed to a device main body at an outer end portion of the deformable portion, the substrate is fixed to the strain inducing body, and an inside of the cylindrical portion of the strain inducing body includes:

an upper space into which the plunger is inserted; and a lower space formed below the upper space, having an inner diameter larger than that of the upper space, and in which the elastic member is arranged.

2. The multidirectional input device according to claim 1, wherein the elastic member has a dome shape in a case where the pressing operation is not performed.

3. The multidirectional input device according to claim 2, wherein the substrate has two fixed contacts on an upper surface of the substrate, and the elastic member has a movable contact on a lower surface of the elastic member, the movable contact being configured to contact the two fixed contacts of the substrate in accordance with elastic deformation of the elastic member.

4. The multidirectional input device according to claim 1, wherein an outer peripheral surface of the plunger is provided with protrusions protruding in four directions respectively, and an inner peripheral surface of the cylindrical portion of the strain inducing body is provided with grooves provided in four directions respectively and extending in a vertical direction, the grooves allowing the protrusions to slide therein.

5. The multidirectional input device according to claim 1, wherein the strain detecting element is mounted on a flexible printed circuit board, the flexible printed circuit board is bonded to a lower surface of the deformable portion of the strain inducing body, the substrate is provided below the lower surface of the deformable portion of the strain inducing body, and the flexible printed circuit board includes an opening portion through which a part of the elastic member penetrates.

6. A multidirectional input device capable of performing a tilting operation and a pressing operation, the multidirectional input device comprising:

a strain inducing body that includes a cylindrical portion and one or more deformable portions provided on an outer side of the cylindrical portion;

a plunger provided inside of the cylindrical portion of the strain inducing body;

a strain detecting element provided at a deformable portion of the strain inducing body, the deformable portion being from among the one or more deformable portions;

a substrate provided on a bottom portion of the cylindrical portion of the strain inducing body; and an elastic member provided between the substrate and a bottom portion of the plunger, wherein the strain inducing body is fixed to a device main body at an outer end portion of the deformable portion, the substrate is fixed to the strain inducing body, the deformable portion of the strain inducing body has a shape of a plate extending in a planar direction from a lower end of the cylindrical portion and having a width in a planar direction greater than a thickness in the vertical direction, the strain inducing body includes fixing pieces provided to respectively protrude in four directions from the lower end of the cylindrical portion, and the substrate is fixed to the fixing pieces.

7. The multidirectional input device according to claim 6, wherein the device main body includes a device-side protrusion provided at a position facing the outer end portion of the deformable portion and projecting upward from a flat portion, and the outer end portion of the deformable portion is fixed to the device-side protrusion.

8. The multidirectional input device according to claim 6, wherein the outer end portion of the deformable portion protrudes downward relative to an other portion of the deformable portion.

9. The multidirectional input device according to claim 6, wherein the deformable portion of the strain inducing body is provided at a position protruding downward beyond the fixing pieces of the strain inducing body.

10. The multidirectional input device according to claim 9, wherein the strain detecting element is mounted on a flexible printed circuit board, the flexible printed circuit board is bonded to a lower surface of the deformable portion of the strain inducing body, the substrate is provided above the lower surface of the deformable portion of the strain inducing body, and each of the two fixed contacts provided on the upper surface of the substrate is electrically connected to the flexible printed circuit board via a through-hole via provided in the substrate.

* * * * *